July 11, 1967    R. SEIBOLD    3,330,260
GAS-TIGHT PIPE WALL WITH FIN-EQUIPPED PIPES
Filed March 30, 1966
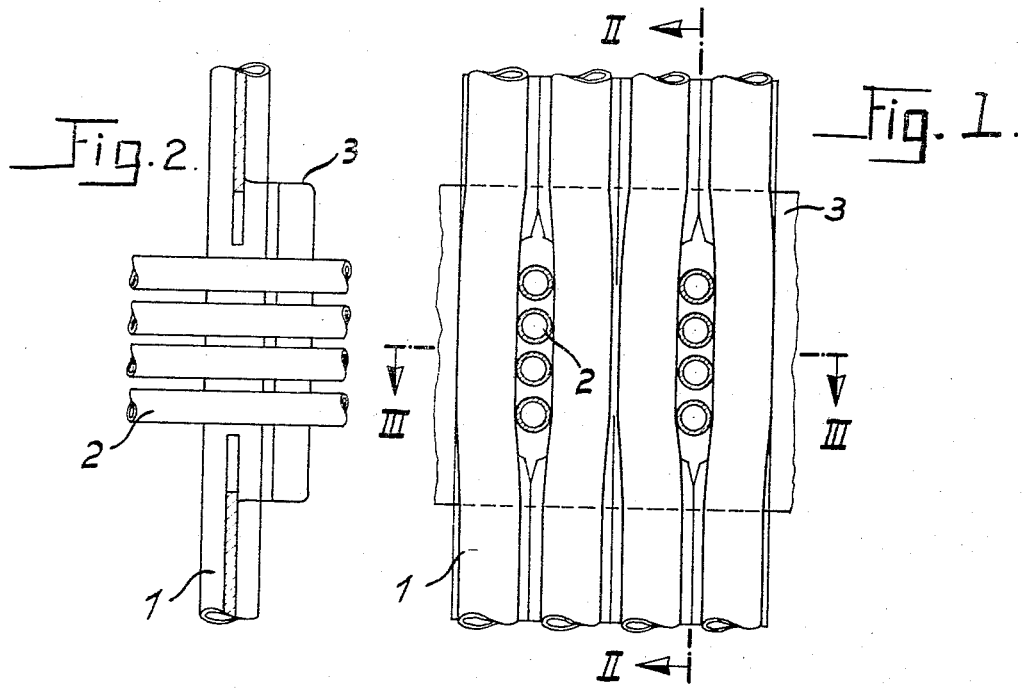
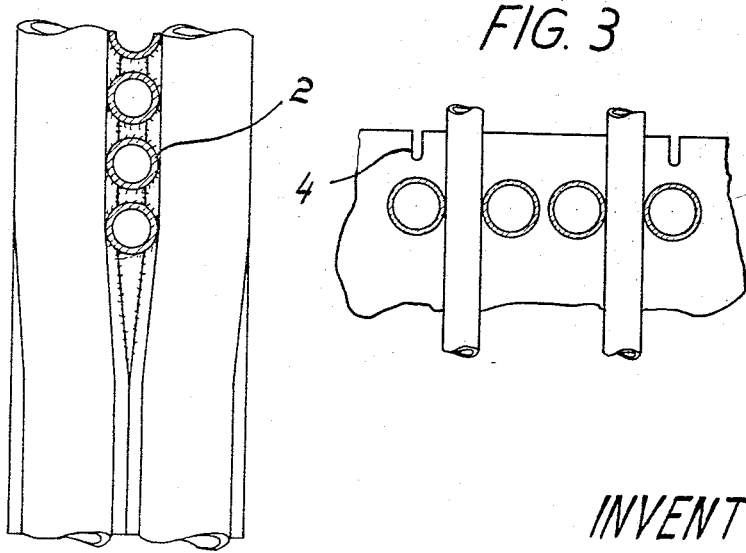
INVENTOR
Rudolf Seibold
By Walter Becker – # United States Patent Office 3,330,260
Patented July 11, 1967

3,330,260
GAS-TIGHT PIPE WALL WITH FIN-EQUIPPED PIPES
Rudolf Seibold, Gummersbach, Germany, assignor to L. & C. Steinmuller G.m.b.H., Gummersbach, Rhineland, Germany
Filed Mar. 30, 1966, Ser. No. 538,721
Claims priority, application Germany, Apr. 2, 1965, St 23,615
5 Claims. (Cl. 122—6)

The present invention concerns a gas-tight pipe wall with fin-equipped pipes. With pipe walls of this type, the drawback is encountered that when passing therethrough superheater pipes, preheater pipes or supporting pipes, considerable difficulties are encountered and costs are involved in view of the welded-on fins. It is known at the areas where such superheater pipes, preheater pipes or supporting pipes are to pass through the pipe wall, to cut out windows and to replace the then cut-out finned pipes by bent smooth pipes. When a fin-equipped pipe wall is penetrated over its entire width by a plurality of superheater pipes, preheater pipes and supporting pipes, it is also known to replace these penetrating areas over the entire width by bent smooth pipes. The latter will then have to be welded to the respective fin-equipped pipes in a special working operation. Aside from the fact that with such a connection tensions in the material cannot be avoided which later on unfavorably affect the operation of the boiler, considerable work and costs are involved. Moreover, in this way, the number of welding areas within the entire pipe system is increased which fact is undesirable because it reduces the safety of a boiler installation.

It is, therefore, an object of the present invention to provide a gas-tight pipe wall of the above mentioned general type which will overcome the drawbacks outlined above.

It is another object of this invention to provide a continuous pipe wall with fin-equipped pipes which will have considerably less welding areas than heretofore known pipe walls of the type involved.

These and other objects and advantages of the invention will appear more clearly from the following specification in connection with the accompanying drawing, in which:

FIG. 1 represents a cutout of a pipe wall with fin-equipped pipes in which between each two adjacent pairs of pipes there are passed superheater pipes, preheater pipes or supporting pipes.

FIG. 2 is a section taken along the line II—II of FIG. 1.

FIG. 3 is a section along the line III—III of FIG. 1.

FIG. 4 illustrates the fitting piece between the tubes 2.

The present invention is based on the finding that the number of the welding areas within a boiler, especially a boiler in which superheater pipes, preheater pipes or supporting pipes are passed through a wall of fin-equipped pipes, can be considerably reduced by employing at the respective passages of said pipes no smooth pipes but by merely bending out the respective fin-equipped pipes at said passages within the said pipe wall plane. The fin sections present in said area or passages must, of course, be removed in order to be able by means of such bent-out pipes to provide a smooth wall.

The present invention is characterized primarily in that at said passages or areas, where for instance superheater pipes, preheater pipes, supporting pipes or the like pass through, the fins extending in the longitudinal direction of the pipes are removed and in this area the fin-equipped pipes are bent out within the said wall plane. Depending on the prevailing conditions, especially the superheater pipes, preheater pipes or supporting pipes passing through a wall of fin-equipped pipes, one or a plurality of such fin-equipped pipes may in conformity with the present invention be bent in the range of the respective passage within the said pipe wall plane.

In order to assure a gas-tight closure within this range of the fin-equipped pipe wall, a box-shaped element is provided on that side of the fin-equipped pipe wall which faces away from the fire box, and, more specifically, within the range of the passages for the superheater pipes, preheater pipes or supporting pipes. It is through this box-shaped element that the said pipes are passed toward the outside in a gas-tight manner. This box-shaped element may in conformity with the invention be so designed that the heat expansions caused by the influence of the temperature thereon will be compensated for. Preferably, this box-shaped element may be provided with folds or may be corrugated.

When pipes, as for instance, boiler pipes are involved which have approximately the same temperature as the finned pipe wall, the pipes passing through the respective passages may be welded at said passage areas directly to the finned pipe wall while employing fitting pieces.

Referring more specifically to the drawing, the fin-equipped pipes 1 form the finned pipe wall. Within the areas where, for instance, superheater pipes, preheater pipes or supporting pipes 2 pass through said wall, as shown in FIG. 1, these finned pipes are bent within the plane of the finned pipe wall. On that side of the finnned pipe wall which faces away from the fire box there is provided a box-shaped element 3 which is welded in a gas-tight manner to the outside of the finned pipe wall and through which the superheater pipes, preheater pipes or supporting pipes are passed in a gas-tight manner.

As will be seen from FIG. 3, the said box-shaped element 3 has some areas provided with expansion folds for compensating the increased expansion as to width caused for instance by the higher heated pipes such as superheater pipes.

As will be evident from the above, the present invention permits in a simple and expedient manner the build-up of a pipe wall while employing continuous fin-equipped pipes. As will also be evident from the above, a finned pipe wall according to the invention has considerably less welding areas than heretofore known walls of the type involved so that a wall according to the present invention considerably increases the safety of a boiler installation and also facilitates the manufacture thereof while simultaneously reducing the cost of manufacture.

It is, of course, to be understood that the present invention is, by no means, limited to the particular construction shown in the drawing but also comprises any modifications within the scope of the appended claims.

What I claim is:

1. A gas-tight pipe wall, especially for use in connection with boiler installations, which includes: first pipe means arranged alongside each other and respectively provided with fin means extending in the longitudinal direction of said first pipe means, adjacent fin means being welded to each other, adjacent fin means of at least some adjacent first pipe means having cutouts arranged in alignment with each other while adjacent first pipe means within the area of said cutouts and respectively pertaining to adjacent fin means with said cutouts therein are bent away from each other within the plane of said pipe wall to thereby define passage means between adjacent first pipe means, second pipe means extending through said passage means, and means connecting said second pipe means to the respective adjacent first pipe means in a gas-tight manner.

2. A gas-tight pipe wall according to claim 1, in which said first pipe means within the area of said cutouts are bent away from each other in conformity with the diameter of said second pipe means.

3. A gas-tight pipe wall according to claim 1 for use in connection with a boiler having a fire-box, which includes a box-shaped element arranged on that side of said wall which faces away from said fire-box and located within the area of said passage means, said second pipe means extending through said box-shaped element and being welded thereto in a gas-tight manner.

4. A gas-tight pipe wall according to claim 3, in which said box-shaped element is provided with folds on the outside thereof for absorbing heat expansions.

5. A gas-tight pipe wall according to claim 1, in which said second pipe means are welded to said first pipe means within the area of their penetration through said passage means.

References Cited

UNITED STATES PATENTS

| | | | |
|---|---|---|---|
| 2,976,857 | 3/1961 | Herold | 122—510 X |
| 3,267,913 | 8/1966 | Bruhl | 122—510 |
| 3,274,977 | 9/1966 | Rickard et al. | 122—510 X |

KENNETH W. SPRAGUE, *Primary Examiner.*